United States Patent [19]

Suelflow et al.

[11] 4,225,959
[45] Sep. 30, 1980

[54] TRI-STATE BUSSING SYSTEM

[75] Inventors: Robert E. Suelflow, Scottsdale; Edward M. Drobny, Phoenix, both of Ariz.

[73] Assignee: Honeywell Information Systems Inc., Phoenix, Ariz.

[21] Appl. No.: 930,966

[22] Filed: Aug. 4, 1978

[51] Int. Cl.³ .............................................. G06F 11/08
[52] U.S. Cl. ....................................... 371/38; 364/900
[58] Field of Search ................ 235/312; 364/200, 900; 371/38

[56] References Cited

U.S. PATENT DOCUMENTS

| | | | |
|---|---|---|---|
| 3,693,153 | 9/1972 | Rosenfeld | 235/312 X |
| 4,037,091 | 7/1977 | Beuscher | 235/312 |
| 4,058,851 | 11/1977 | Scheuneman | 364/900 |
| 4,112,502 | 9/1978 | Scheuneman | 364/900 |

*Primary Examiner*—David H. Malzahn
*Attorney, Agent, or Firm*—T. W. DeMond; W. W. Holloway, Jr.; R. T. Reiling

[57] ABSTRACT

This relates to an apparatus and method for providing an accurate data group to the instruction buffer of a data processing system.

The data group is simultaneously applied to the instruction buffer and to the error correcting apparatus. After analysis of the data group in the error correcting apparatus, the operation in progress is aborted if an error has been detected, and the error is not correctable. If correctable, the correct instruction data group is applied to the execution unit. If no error is detected in the data group, utilization of the data group proceeds uninterrupted.

Two, three state busses are employed. The first three state bus is used to transmit memory data to the error detection and correction (EDAC) circuitry, to transmit corrected data from the (EDAC) circuitry and to the data output circuits and to transmit input data to the memory. The second three-state bus transmits data to the instruction buffer, to the EDAC circuitry and also transmits corrected data from data output circuits to the instruction buffer.

10 Claims, 5 Drawing Figures

4,225,959

TRI-STATE BUSSING SYSTEM

BACKGROUND OF THE INVENTION

1. Field of the Invention

This invention relates generally to data processing systems, and more particularly, to a method and apparatus for transmitting an accurate data group from an execution unit control store to the instruction buffer of a central processing unit by means of two, three-state data busses.

2. Description of the Prior Art

In data processing systems wherein various subsystems must communicate with each other, errors, for example those caused by the presence of noise, sometimes result in the receipt of data which is not the same as that which was transmitted. Specifically, data processing systems generally employ, as a means of communication, signals corresponding to a high level and a low level state, often referred to as logic states "1" and "0" respectively. Noise or equipment faults may cause receipt of a "1" or "0" when in fact a "0" or "1", respectively, has been transmitted.

A data group or word consists of a plurality of 1's and 0's. For example, the code group 101 may correctly represent the quantity 5. If an error is introduced during transmission, the code group may be received as the binary code 100, corresponding to the quantity 4. While well known parity checking techniques provide a convenient means for detecting an error in a single bit, such a parity check fails if two bits are in error. Cyclic codes were developed and represent a marked improvement over the parity approach in that multiple errors can be detected. A detailed treatment of error correction techniques may be found in Hamming, "Error Detecting and Error Correcting Codes" Bell System Technical Journal, Volume 29, 1950, pages 147–160. The application of Hamming's work permitted the detection and correction of randomly occurring errors within a single bit of a received code word.

It is well known to employ error detection and correction (EDAC) apparatus to check and correct data extracted from a main memory system and bound for other subsystems in the data processing systems, for example, the central processing unit. However, in the past, such apparatus was not employed to verify and correct microinstructions from the instruction unit control store within the central processing unit itself. If an error occurred in the microinstruction data being forwarded from the control store to an execution buffer, the process would simply be aborted and re-executed since it was generally felt that the error was the result of a transient transmission problem.

SUMMARY OF THE INVENTION

It is an object of the present invention to provide, in a data processing system, error detection and correction apparatus within the central processing unit itself to insure that accurate data groups are forwarded from the execution unit control store to the execution buffer.

It is the further object of the invention that the presence of the error detection and correction apparatus neither delay transmission of data groups from the control store to the execution buffer, nor require an excessive amount of additional hardware.

According to a broad aspect of the invention there is provided in an execution control store unit of a data processing system central processor, a bussing apparatus for supplying an accurate data group to an instruction buffer, comprising: a first data bus coupled to said memory and including a plurality of data lines for supplying data retrieved from said memory to said instruction buffer and to said error detecting and correcting circuitry and for supplying corrected data to said instruction buffer; and a second data bus coupled to said error detecting and correcting circuitry, to said memory and to said first data bus for receiving memory data from said first data bus and applying it to said error detecting and correcting circuitry and for supplying corrected data to said first data bus.

The above and other objects of the present invention will be more clearly understood from the following detailed descriptions taken in conjunction with the accompanying drawings, in which:

DESCRIPTION OF THE PREFERRED EMBODIMENT

Figure 1:
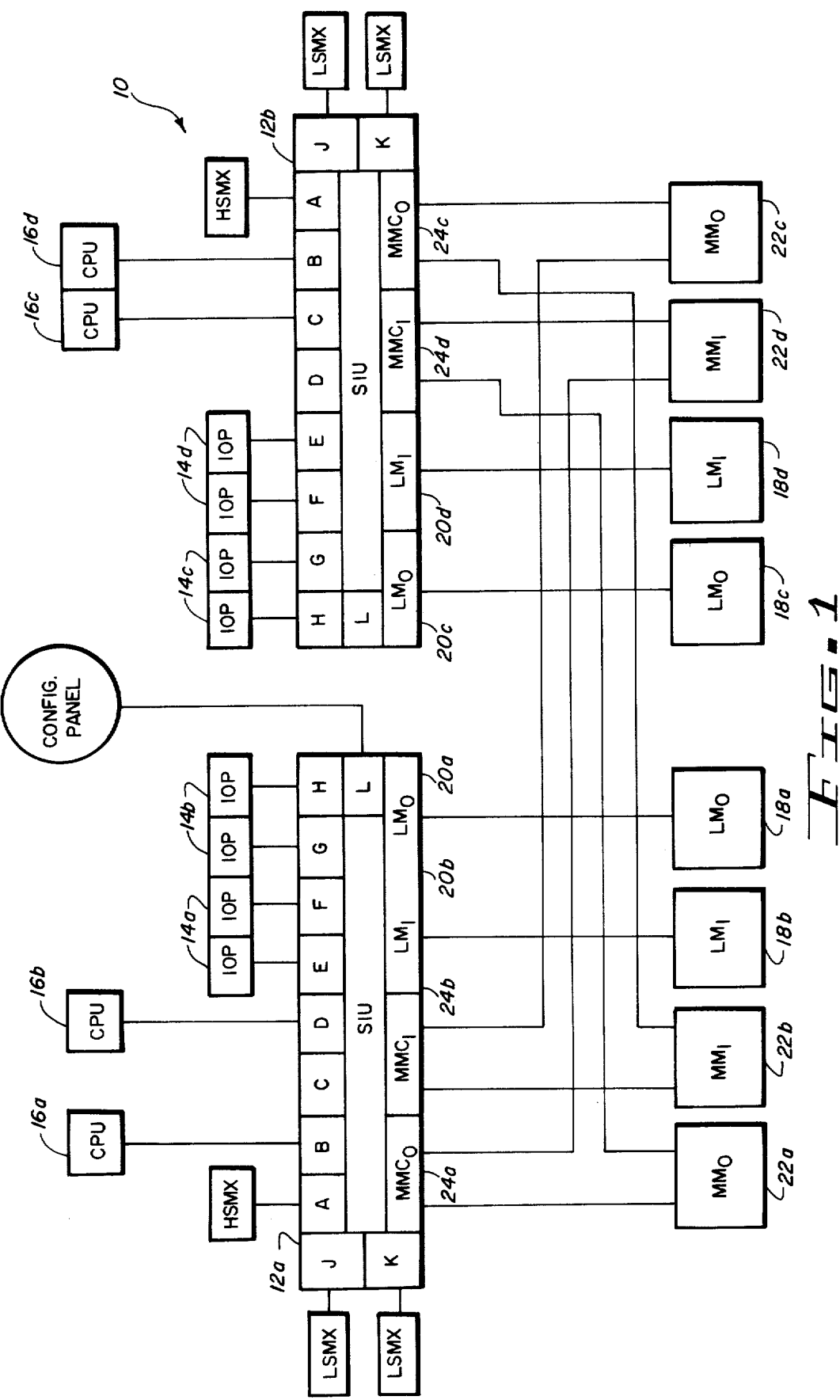
FIG. 1 is a block diagram of a data processing system.

FIG. 1 is a block diagram of an improved data processing system 10 into which the present invention is incorporated. Data processing system 10 has two SIU's 12a and 12b. Each SIU has fifteen ports identified by letters A thru H, J, K, and L plus four additional memory ports; local memory port O, (LMO), local memory port 1, (LM1), and two main memory ports in which the main memory control function or controllers (MMC0 and MMC1) are located. To certain pairs of ports such as G and H and E and F, a pair of locked I/O processors (IOP) 14a, 14b, 14c and 14d can be attached. Up to four central processing units (CPU's) 16a, 16b, 16c and 16d two to each SIU, can be attached to any two of the ports A, B, C, D, E, F, G, or H. Local memory (LMO) 18a, 18c are connected to the local memory ports (LMO) 20a and 20c, and local memory (LM1) 18b and 18d are connected to local memory ports (LM$_1$) 20b, 20d of each SIU 12, and a main memory (MM) 22a, 22c and (MM$_1$) 22b, 22d can be connected to the main memory controller (MMC$_o$) 24a, 24c and (MMC$_1$) 24b, 24d of the SIU's 12a and 12b. Each of the main memories 22a, 22c and 22b, 22d also has two ports which are cross-connected to permit communications to occur between devices and memories attached to the respective SIU's 12.

Each of the main memory controllers MMC$_o$24a, 24c, MMC$_1$ 24b, 24d of SIU's 12a, 12b in addition to writing data into a main memory MM$_o$ 22a, 22c, or MM$_1$ 22b, 22d and to reading data out of MM$_o$ or MM$_1$ also has certain communication control functions.

Communications between SIU's can be from a main memory controller such as MMC$_o$ 24a of SIU 12a to the main memory controller MMC$_1$ 24d of SIU 2b. MMC$_1$ 24d in turn directs the communication to the designated port of SIU 12b to which is attached a processor such as IOP 14c or CPU 16c, for example, of SIU 12b, the processor to which the communication is directed.

A CPU such as 16a in the course of performing an application program; will reach a point where an operation is required either to bring in from a peripheral device data stored in the peripheral device or to read out from memory information to be transferred to a peripheral device. When the need for an I/O operations occurs, or more broadly, whenever one processor needs to communicate with another processor including itself, the operating system of the data processing system 10 will cause an instruction to be transmitted to a CPU such as 16a. The contents of the operational field of the instruction word is such as to indicate or designate a specific type of communication is to be performed or executed. The operating system will also provide 16a with a data word, a designated field of which will identify the processor to which the communication is to be sent.

Figure 2:
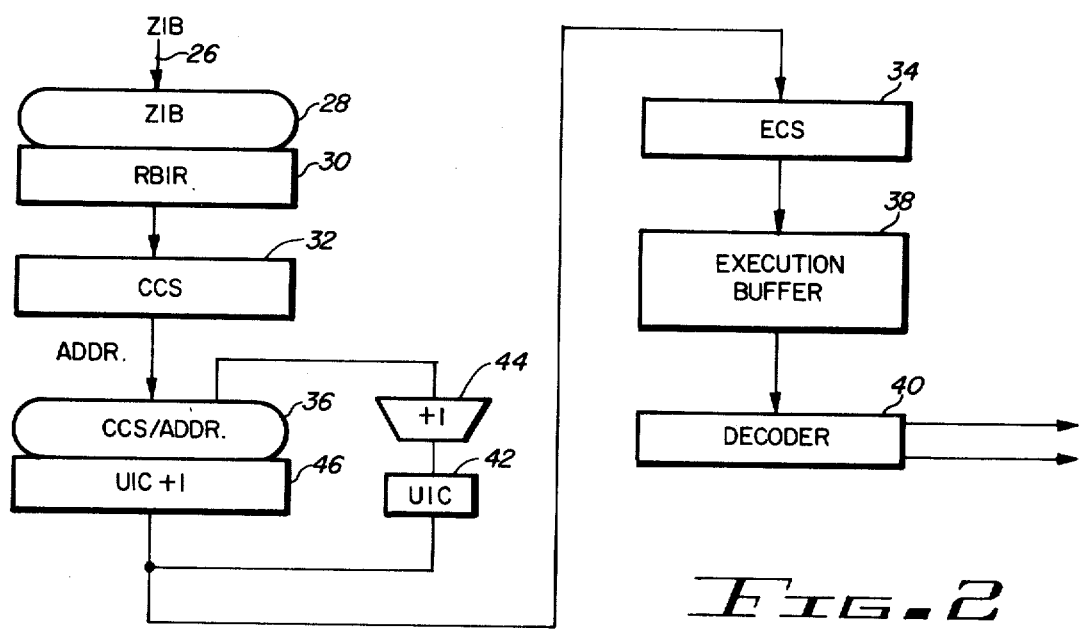
FIG. 2 is a functional diagram of a portion of the central processing unit.

FIG. 2 is a block diagram of the hardware elements of a CPU 16 which will be described below only to the extent necessary to set the proper stage for a description of the present invention. A more-detailed description can be found in copending U.S. patent application Ser. No. 746,444 filed Dec. 1, 1976 (now abandoned) and assigned to the assignee of the present invention.

Referring to FIG. 2, instructions are received over an instruction buffer ZIB 26 from a main memory controller such as $MMC_o24a$ and are transmitted through ZIB switch 28 to RBIR 30 for storage therein. The control unit control store word which is stored in control unit control store CCS32 comprises 32 bits. A thirteen bits field consisting of bit positions 0 thru 12 is the address of the starting location for the microprogram specified by the operation code of the instruction word in instruction register RBIR 30 or the address of the initial microinstruction of the microprogram. When the operation code from an instruction is applied to CCS 32 from RBIR 30, the control unit control word stored at the address corresponding to the OP code, the contents of bit position 0 thru 12 will be applied to the execution unit control store (ECS) 34 thru switch CCSADR 36. The receipt of the address of the microinstruction by ECS 34 causes the microinstructions stored at that address to be transferred to the execution buffer 38 where selected fields of the microinstruction are decoded by decoder 40 to provide the necessary control signals or information to the various subsystems, or components, of a CPU such as CPU 16a.

When the first microinstruction has been loaded into the execution buffer 38, and during the next clock period, the microinstruction will be decoded in decoder 40 to provide the necessary information and control signals to cause a scratchpad memory (not shown) to be addressed and a portion of its contents to be transferred, stored and operated upon.

The next or second microinstruction which is produced as a result of the address of the first microinstruction which is stored in microinstruction register UIC 42 being incremented by one by adder 44 and applied thru switch UIC+1, 46 will cause the second microinstruction to be transferred to execution buffer 38.

Figure 3:
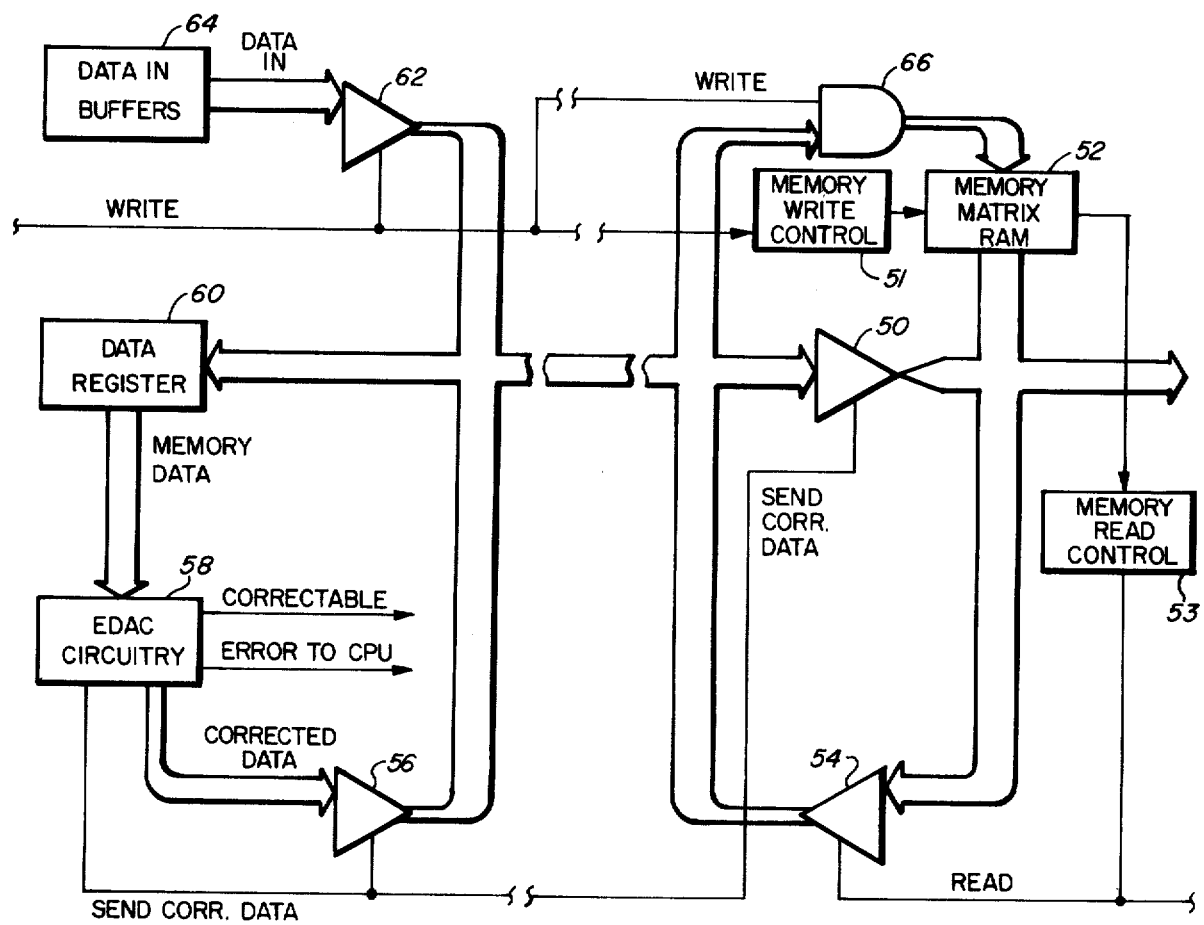
FIG. 3 is a functional block diagram of an inventive part of the execution unit.

FIG. 3 is a functional block diagram of a portion of the execution control store (34 in FIG. 2) which is the subject of the present invention. Two separate but interrelated three state data busses are used. The first, referred to as the memory data bus, is connected between the output of three state device 50, the input of three state device 54, the output of memory 52 and the input of execution buffer 38 (FIG. 2). The second bus, referred to as the back-panel bus, is connected between the output of three state devices 56, 62 and 54, and between the inputs of data register 60, AND function 66 and three state device 50. It should be understood that while each of the busses are shown as a single line, each is composed of a plurality of lines for handling the parallel transfer of a plurality of data bits.

The error detection and correction (EDAC) employed is out of cycle detection and correction. To accomplish this, data from memory 52 to execution buffer 38 is assumed correct for any current cycle and is strobed into the execution buffer on the system clock. During the following cycle, this same data is checked for errors in EDAC circuitry 58. If a correctable error is detected, a signal is sent to another portion of the CPU and corrected data is placed on the bus to be re-strobed into the execution buffer on the following clock. Any uncorrectable errors result in a system abort.

Two critical timing paths are involved in this scheme. It is first necessary to get data from memory 52 to the execution buffer before the system clock occurs. The second involves making an error signal and the corrected data available to the execution buffer before the following clock.

The output of memory 52 is coupled to execution buffer 38. The same output is likewise coupled to the input of a three state buffer 54, for example, of the type manufactured by Texas Instruments and bearing part number 74S240, for transmission of the data to EDAC circuitry 58 via data register 60. During this time, three state buffer 54 is enabled by a read signal which originates in another portion of the CPU. Simultaneously, three state buffers 50, 56 and 62 are disabled and present a high impedance to their respective busses. That is, three state buffer 62 is disabled by the absence of write signal on its input. Likewise, absence of a write signal at a second input of AND function 66 prevents data bound for the EDAC circuitry from re-entering memory 52 via AND function 66. Similarly, three state buffers 50 and 56 are disabled by the absence of a send correct data signal which originates in EDAC circuitry 58. Thus, data may be transmitted from three state buffer 54 to the EDAC circuitry without interference.

During a correction cycle, the same two bi-directional busses transmit data from three state buffer 56 to the execution buffer via three state buffer 50. During this time, buffer 62 and AND function 66 are disabled by the absence of the write signal and three state buffer 54 and memory 52 are disabled by the absence of a read signal. Buffers 50 and 56 are enabled by a corrected data signal and transmit data from the EDAC circuitry 58 to the execution buffer. It should be noted that the memory data bus which connects buffers 50, 54 and memory 52 to the execution unit eliminates the need for a conventional data switch which would represent an extra stage of delay in the data path to the remainder of the CPU for either memory data or corrected data.

Figure 4:
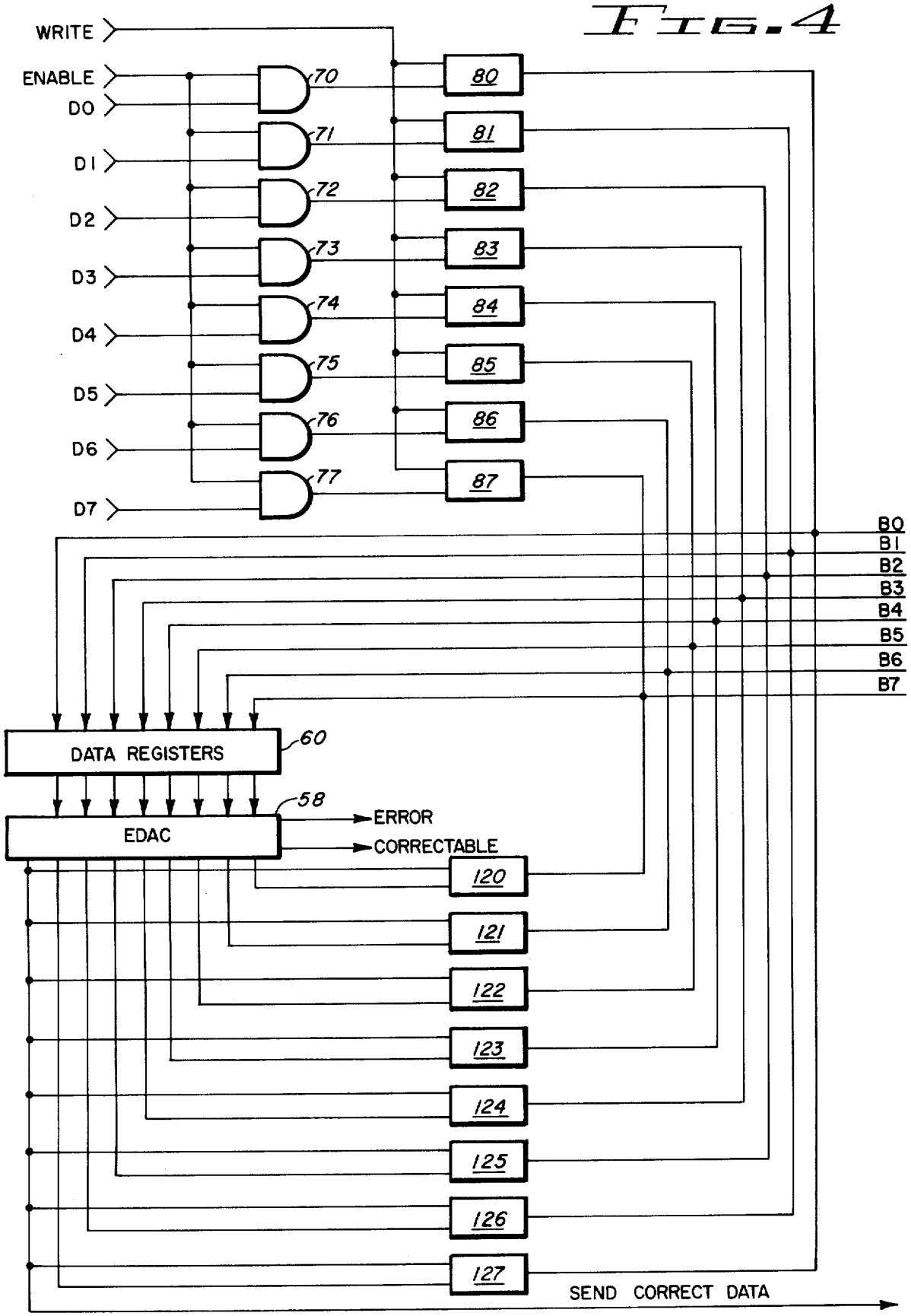
FIGS. 4 and 5 are more-detailed diagrams of the arrangements shown in FIG. 3.
Figure 5:
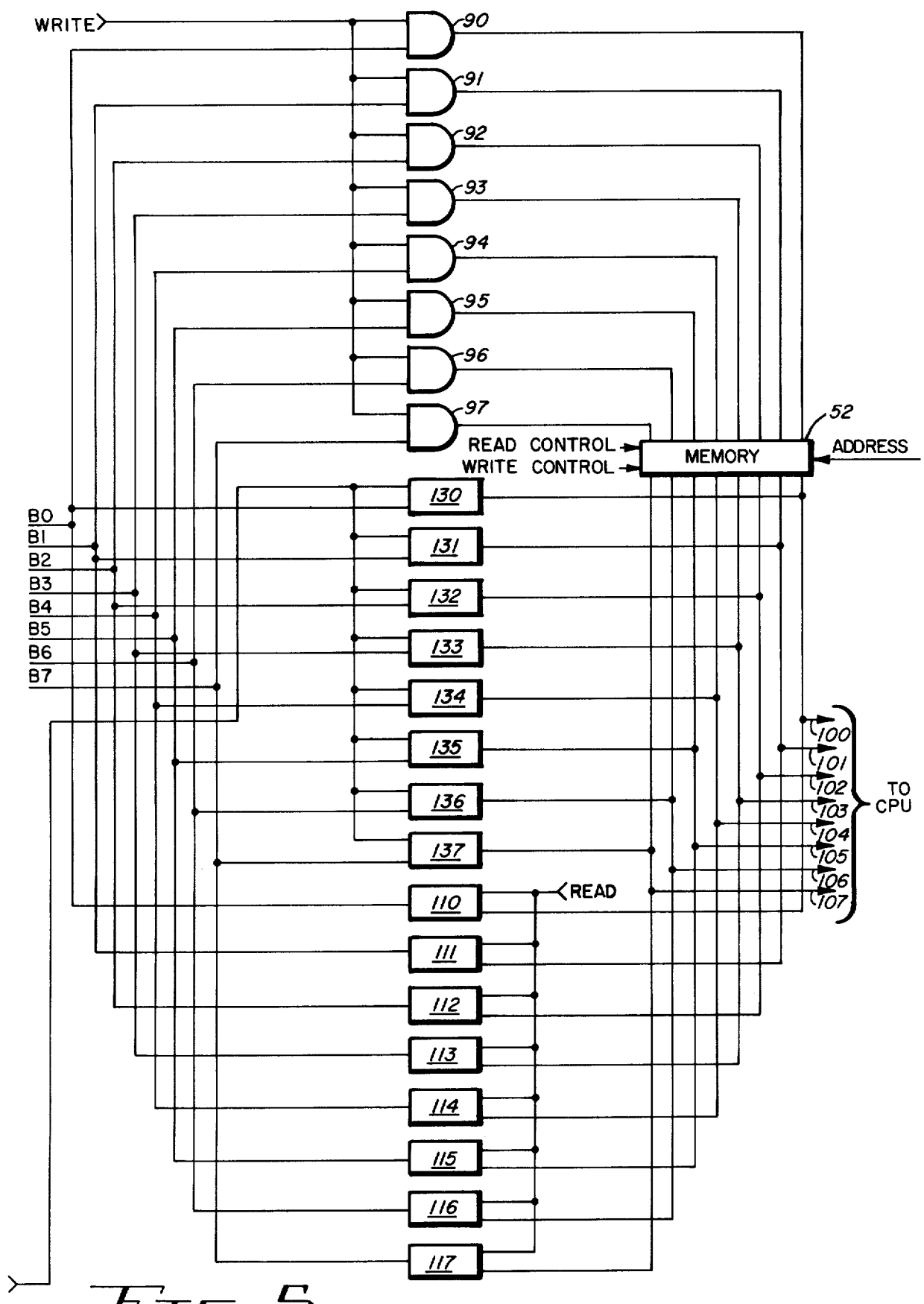

During write cycles, data from buffer 64 is transmitted to memory 52 via buffer 64, and three state device 62 and AND function 66. During this operation, three state buffers 50, 54 and 56 are disabled as described above. The arrangement shown in FIG. 3 is shown in more detail in FIGS. 4 and 5. While the arrangement in FIGS. 4 and 5 is shown as being capable of handling 8 bits of data, it should be clear, that this is given by way of example only, and that the arrangement can be expanded to include a much larger number of data bits.

The data-in buffers 64 (FIG. 3) are shown as AND gates 70-77. Three state device 62 (FIG. 3) is shown as a plurality of three state gates 80–87 in FIG. 4. One three state gate is required for each data line. As described earlier, the three state device, when enabled, will pass the data applied to its input on to its destination. That is, when the write signal which is shown coupled to each of the three state devices 80–87 is on, data applied to three state devices 80–87 via AND gates 70–77 will pass on thru the three state devices to the data bus lines B0–B7. When the write signal is disabled, the three state devices 80–87 appear as high impedence node.

During a write cycle, data to be written into the memory is applied to one input each of AND gates 70–77. This data passes thru AND gates 70–77 when an enable signal coupled to a second input of each of the AND gates 70–77 is activated. Referring now to FIG. 5, what was shown as a single AND function 66 in FIG. 3 is shown as a plurality of AND gates 90–97 each of which have one input coupled to the data bus lines B0–B7 and a second input coupled to a write enable signal. When the write enable signal is activated, the data on data bus lines B0–B7 passes thru AND gates 90–97 to memory 52 where it is stored therein by write control.

During a read cycle, the write signal is disabled preventing data from passing thru three state buffers 80–87 and AND gates 90–97. When memory 52 has a read control signal and an address applied thereto, the memory outputs the data stored in that address. This data travels two paths. The first is to the remainder of the CPU as is shown by lines 100–107 (three state device 54 in FIG. 3). Simultaneously, the data from memory 52 is applied to the three state devices 110–117. Each of three state devices 110–117 also has applied to an input a read enable signal which, when activated, allows data to pass through the three state devices. When the read signal is disabled, three state devices 110–117 appears a high impedance node.

Assuming the read signal is enabled and the write signal disabled, data from memory 52 passes thru three state devices 110–117 and is applied to the inputs of data register 60 (FIG. 4) over data bus lines B0–B7. The data in data register 60 is applied to the EDAC circuitry 58 as described above where it is determined if there is an error in the data and whether or not the error is correctable. Two signals are sent from the EDAC circuitry to another portion of the CPU. These signals are shown as an error signal and an error correctable signal which indicates that while there is an error, the error is correctable.

If the error is correctable, the same correct data signal is applied to three state devices 120–127. The corrected data is likewise applied to three state devices 120–127 and passes therethru to the inputs of three state devices 130–137 over bus lines B0–B7. During this period of time, the write signal is disabled thus preventing the data from passing thru AND gates 90–97 back to memory 52.

The same correct data signal, described previously, is applied to three state devices 130–137 to enable passage of the data on bus lines B0–B7 to the CPU via lines 100–107. During this period of time, the read signal is disabled to prevent the corrected data from passing thru three state devices 110–117.

Thus, the above described arrangement permits three electrical functions to be performed on one line referred to as the backpanel bus. These functions are transmitting memory data to the EDAC circuitry, transmitting corrected data from the EDAC circuitry to the data putput circuits and transmitting input data to the memory.

The memory data bus permits transmission of data to both the CPU and the EDAC circuitry. In addition, the memory data bus provides for transmission of corrected data from the EDAC circuitry to the CPU. Both busses minimize the need for any additional gates or switches, and thus presents the fastest possible data paths where critical timing is involved.

What is claimed is:

1. A bussing apparatus within a data processing system central processor including a memory capable of storing data groups, said apparatus supplying an accurate data group to an instruction buffer comprising:

a first data bus receiving a data group from said memory and coupled to said instruction buffer for supplying said data group thereto;

a first means connected to said first data bus for transferring said data group;

a data register storing said data group from said first means;

a second data bus connected to said first means for supplying said data group to said data register;

an error detection and correction circuitry connected to receive said data group from said data register and producing a corrected data group;

a second means transferring said corrected data group to said second data bus;

a third means connected to transfer said corrected data group from said second data bus to said first data bus whereby said corrected data group is supplied to said instruction buffer from said first data bus.

2. A bussing apparatus according to claim 1 further including writing means coupled to said memory and to said second data bus for writing data into said memory.

3. A bussing apparatus according to claim 2 wherein said writing means comprises:

a first plurality of buffers for receiving data to be stored in said memory;

one plurality of switching devices each having a first input coupled to the output of one of said first plurality of buffers for gating the received data onto said second data bus; and a second plurality of buffers having inputs coupled to said second data bus and having outputs coupled to said memory.

4. A bussing apparatus according to claim 3 wherein each of said one plurality of switching devices is a tri-state gate which, when enabled, passes data applied to its input and, when disabled, presents a high impedance at its output.

5. A bussing apparatus according to claim 4 wherein each of said tri-state gates are enabled by a WRITE signal generated by said central processor and applied to a second input of each of said tri-state gates, and wherein each of said tri-state gates are disabled by the absence of a WRITE signal at said second input.

6. A bussing apparatus according to claim 1 wherein each of said first plurality of switching devices is a tri-state gate which, when enabled, passes memory data to said second data bus and, when disabled, presents a high impedance at its output.

7. A bussing apparatus according to claim 6 wherein each of said first plurality of switching devices is enabled by a READ signal generated by said central processor and wherein each of said first plurality of switching devices is disabled by the absence of said READ signal.

8. A bussing apparatus according to claim 1 wherein said first means comprises a first plurality of switching devices each having an input coupled to said first data bus and an output coupled to said second data bus.

9. A bussing apparatus according to claim 8 wherein said second means comprises:
 a second plurality of switching devices having inputs coupled to said error detection and correction circuitry and having outputs coupled to said second data bus for presenting said corrected data group from said error detection and correction circuitry to said second data bus; and said third means comprises:
 a third plurality of switching devices having inputs coupled to said second data bus and outputs coupled to said first data bus for transmitting said corrected data group.

10. A bussing apparatus according to claim 9 wherein said second and third plurality of switching devices which, when enabled by said error detection and correction circuitry, pass the corrected data and, when disabled by said error correction and detection circuitry, present a high impedance output.

* * * * *